United States Patent [19]
Ainsworth

[11] 3,775,603
[45] Nov. 27, 1973

[54] POWER SYSTEM SIMULATORS
[75] Inventor: John Desmond Ainsworth, Stafford, England
[73] Assignee: The English Electric Company Limited, London, England
[22] Filed: July 11, 1972
[21] Appl. No.: 270,742

Related U.S. Application Data
[63] Continuation-in-part of Ser. No. 74,540, Sept. 18, 1970, abandoned.

[30] Foreign Application Priority Data
Sept. 19, 1969 Great Britain.................. 46,224/69

[52] U.S. Cl............. 235/185, 235/184, 235/151.21
[51] Int. Cl............................................. G06g 7/50
[58] Field of Search................ 235/184, 185, 151.21

[56] References Cited
UNITED STATES PATENTS
| | | | |
|---|---|---|---|
| 3,675,002 | 7/1972 | Mitsui et al. | 235/185 |
| 2,516,000 | 7/1950 | Harder | 235/185 |
| 2,491,095 | 12/1949 | Enns | 235/185 |
| 2,323,588 | 7/1943 | Enns | 235/185 |

Primary Examiner—Felix D. Gruber
Attorney—Keith Misegades et al.

[57] ABSTRACT

This invention relates to a power system simulator which enables power system behaviour to be studied rapidly and resonably accurately. The apparatus comprises a network of components interconnected to form an analogue circuit of the system under investigation, the configuration of the network being identical to that of the system and the components employed being such that phase angle changes in busbar voltages are represented by voltages measured between selected points and power changes are represented by currents or rates-of-change of current in the circuit. The analogue circuit may be based on equations linearized with respect to an initial set of conditions; the inertias of the synchronous machines in the system may be represented in the analogue by capacitors, the reactance and damper winding effects of these machines by an auxiliary network of inductors and resistors, the reactances of lines and transformers by inductors alone, and d.c. links either by passive components, resistors, inductors etc. or operational amplifiers.

10 Claims, 8 Drawing Figures

POWER SYSTEM SIMULATORS

This invention relates to apparatus for simulating changes in power flows and phase angles in a.c. power systems which may, or may not, include a d.c. link, and is a continuation-in-part of my U.S. Pat. application Ser. No. 74540 filed Sept. 18, 1970, now abandoned.

All large a.c. systems including generators interconnected with loads by transmission lines and transformers, form an oscillatory system in which oscillations of power flows and phase angles at frequencies of the order of 0.01 to 3Hz are initiated by any disturbance such as a temporary short circuit.

The behaviour of such systems is of considerable interest for planning and design purposes; for example, pole slipping (transient instability) of the generators may occur in extreme cases following a short-circuit or disconnection of a line or generator and, even if pole slipping does not occur, the oscillations resulting from the disturbance normally take some time to die away and this causes disturbance to consumers throughout the system.

In accordance with this invention, there is provided apparatus for simulating transient changes with respect to time in power flows, phase angles, machine speeds, and frequencies in an a.c. power system embodying synchronous machines caused by disturbances applied to the system, including an analogue network of electrical components, and at least one source of electrical power connectable to said network, wherein the network components are selected and connected such that the differential equations relating the currents and voltages in said network are substantially similar to the linearised differential equations relating said changes of powers, phase angles, machine speeds, and frequencies in said a.c. power system, said electrical power source being connected to provide analog functions of defined disturbances applied to said a.c. power system, and the apparatus including also indicating means connected to said network so as to be responsive to electrical quantities in the network and to provide output signals which are analog functions of said changes in powers, phase angles, machine speeds, and frequencies in said a.c. power system.

Apparatus in accordance with this invention is inexpensive to construct and yet enables power system behaviour to be studied rapidly and reasonably accurately. It is particularly suitable for studying oscillation damping and for optimising control constants.

Various approximations may be made in connection with the system operation, particularly with regard to the linearising of the equations, as suggested above, and thus the analog cannot in general be absolutely precise. It will be satisfactory for most purposes, however, particularly if the phase angle changes in the system are relatively small for any given disturbance. Larger changes will not be accurately represented, but nevertheless a deduction can readily be made from the swing angles observed as to whether or not pole slipping is likely to occur. Critical cases may therefore be selected for subsequent study in more detail by more complex and expensive methods involving the digital computer.

In order that the invention may be fully understood, some embodiments thereof will now be described with reference to the accompanying drawings in which.

Figure 1:
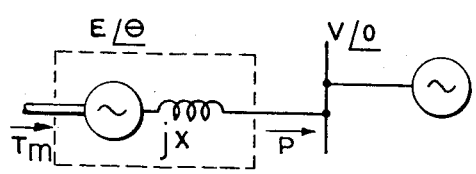
FIG. 1 is a simplified diagram of synchronous generator connected to another synchronous machine via a busbar.

Referring now to FIG. 1, there is shown a synchronous generator, depicted as having a constant alternating e.m.f. E at absolute phase angle $\theta$ with a fixed reactance $X$ connected via a busbar at voltage $V/\theta$ to another synchronous machine. This latter machine will initially be assumed to be of infinite inertia and possess zero impedance, so that the busbar can be regarded as "infinite."

With this arrangement, the electrical power $P$ is given by $$P = EV \sin \theta / X$$

$= EV \cdot \theta / X$ for small values of $\theta$

The shaft of the generator is assumed to be driven at a constant torque $T_m$ by, e.g. a steam or water turbine, and in the steady state the phase angle $\theta$ will be at a value such that the output power $P$ is substantially equal to the mechanical input power.

Thus, for speed close to the rated speed, expressing quantities in per unit, $P = T_m$.

If $\theta$ is different from this particular value mentioned there is a net accelerating or retarding power (or torque) acting on the machine inertia, such that $$2H/W_o \cdot d^2\theta/dt^2 = T_m - P$$

where $H$ is the inertia constant of the machine and $W_o$ is the rated angular frequency.

Considering the above equations now in terms of changes in power and phase angle from initial steady conditions then $$\Delta P = \frac{EV}{X} \cdot \Delta\theta = \frac{1}{\left(\frac{X}{EV}\right)} \cdot \Delta\theta \qquad (1)$$

and $$2H/W_o \cdot d^2(\Delta\theta)/dt^2 = -\Delta P \text{ from which}$$

$$s^2 \Delta\theta = \frac{1}{\left(\frac{2H}{W_o}\right)} \cdot \Delta P \qquad (2)$$

where $s = d/dt$

Figure 2:
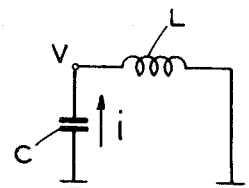
FIG. 2 shows an equivalent analog circuit of FIG. 1.

Referring now to the circuit shown in FIG. 2, consisting of an inductor $L$ and a capacitor $C$ where $v$ is the voltage across the capacitor and $i$ is the current, this circuit may be described by the differential equations $$di/dt = 1/L \, v \ldots$$

$$(3)$$

and $$s^2 v = -1/C \cdot di/dt \ldots \quad (4)$$

Thus, from a comparison between equations (1) and (3) and (2) and (4) it will be seen that the circuit of FIG. 2 can be considered as an analog of the power system shown in FIG. 1, if the following conditions obtain $$di/dt = AB\Delta P \ldots \quad (5)$$

$$v = B\Delta\theta \ldots \quad (6)$$

$$C = A(2H/W_o) \ldots \quad (7)$$

$$L = (1/A)(X/EV) \ldots \quad (8)$$

the constants A and B having been introduced merely as scale factors to obtain convenient component values in the model or analog.

Thus assuming the e.m.f. E and the busbar voltage $V$ in the real system to be fixed, then on the analog $di/dt$ is proportional to a change in real system power, analog voltage $v$ is proportional to change in real system absolute phase angle or shaft angle, analog capacitance $C$ is proportional to the real machine inertia and the analog inductor $L$ is proportional to real machine reactance.

Constant loads (other than synchronous motors) are of no concern and are not represented in the analog since, on the assumption that the a.c. voltage is substantially constant, their power does not change appreciably.

Because of the linear approximation made above ($\theta = \sin\theta$) it can also be assumed that an additional series reactance $X$, e.g. line reactance, having voltages $V_1$ and $V_2$ at its ends, may be represented in the analog by an inductor.

$$L = 1/A \cdot X/V_1 V_2 \ldots \quad (9)$$

provided again that the voltages are assumed constant.

In general, it can be shown that the method may be applied to a power system having any number of machines interconnected by any number of lines and transformers, applying the rules given in equations (5) to (9) to each component in the system.

Figure 3:
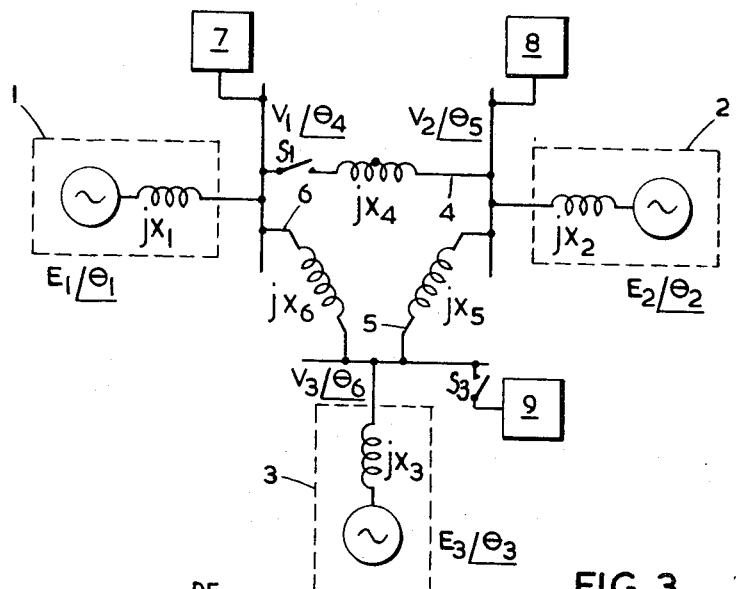
FIG. 3 is a diagram of a more comprehensive system.

One example showing a network of three generators 1, 2, 3 and lines 4, 5, 6 together with the associated loads 7, 8, 9 is shown in FIG. 3.

Figure 4:
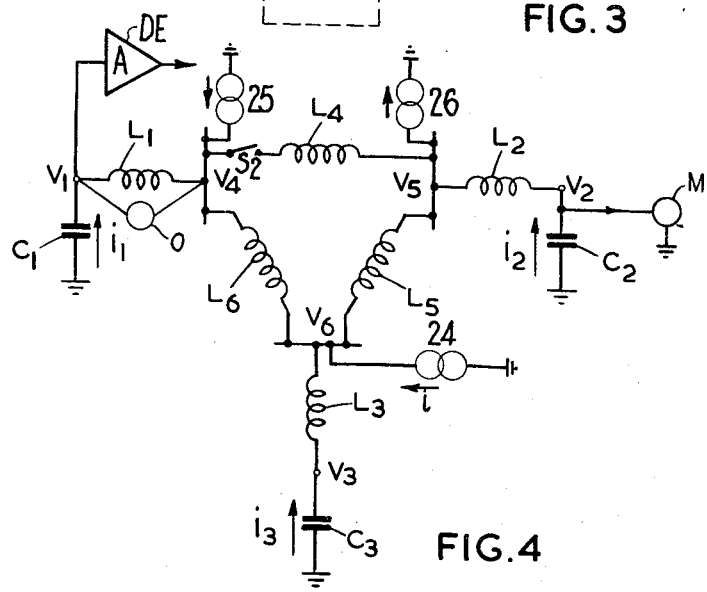
FIG. 4 shows the equivalent analog circuit of FIG. 3.

In the corresponding analogue circuit in FIG. 4 the inertias of the three machines are represented by capacitors $C_1 - C_3$, the machine reactances $X_1 - X_3$ by inductors $L_1 - L_3$ machine rotor (and e.m.f.) angle changes by voltages $v_1 - v_3$, busbar phase angle changes by voltages $v_4 - v_6$, line reactances $X_4 - X_6$ by inductors $L_4 - L_6$ and the power change $\Delta P$ in each machine and line by the corresponding model $di/dt$ (equ. 5) which can be observed as the proportional voltage across an appropriate inductor through which the relevant current flows, as by means of indicating means such as an oscilloscope O shown, for example, across inductor L1. It will be seen from equation 6 that voltages across the capacitors represent changes of absolute phase angle and indicating means of any convenient kind, such as one or more cathode ray oscilloscopes, are provided as at M in accordance with the invention for monitoring and indicating these voltages or currents under proper circuit connections. Voltages elsewhere in the analog circuit represent changes of absolute electrical phase of voltage at corresponding points in the real system, and can similarly be indicated on a cathode ray oscilloscope.

The manner in which the synchronous machines have been represented above neglects the effect of damper windings in these machines, and although this is often adequate for studying the effects of the first peak occurring it is not adequate for studying damping effects. As a result a more comprehensive representation of the machine is sometimes desirable.

Figure 5:
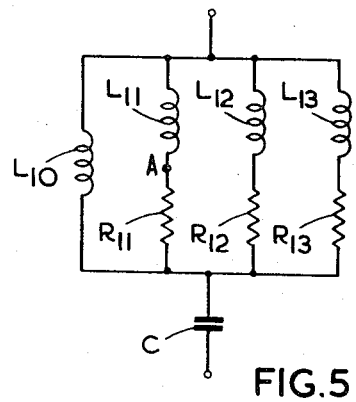
FIG. 5 shows an accurate analog circuit for a synchronous machine.

The analog circuit shown in FIG. 5 is suitable for this purpose, the capacitor $C$ being the same as that shown in FIG. 1, whilst the inductor $L_{10}$ and the inductors $L_{11} - L_{13}$ and associated series resistors $R_{11} - R_{13}$ are calculated from the basic machine parameters and from the initial loading conditions. For a single machine connected to infinite busbars the component values can be shown to be given by:

$$L_{10} = 1/A \left[ (V_o^2 \sin^2\delta_o / X_d) + (V_o^2 \cos^2\delta_o / X_q) + Q_o \right] \quad (10)$$

$$L_{11} = [(X_d X_d^1 / X_d - X_d^1)](1/AV_o^2 \sin^2\delta_o) \quad (11)$$

$$L_{12} = [(X_d^1 X_d'' / X_d^1 - X_d'')](1/AV_o^2 \sin^2\delta_o) \quad (12)$$

$$L_{13} = [X_q X_q'' / X_q - X_q''](1/AV_o^2 \cos^2\delta_o) \quad (13)$$

$$R11 = L_{11}/T_d^1 \quad (14)$$

$$R12 = L_{12}/T_d'' \quad (15)$$

$$R13 = L_{13}/T_q'' \quad (16)$$

where $V_o$ = terminal voltage p.u.
$\delta_o$ = initial rotor angle
$Q_o$ = initial reactive power
and $X_d, X_d^1, X_d'', X_q, X_q'', T_d^1, T_d'', T_{do}'', T_{kd}, T_q''$ have the normal meanings of synchronous machine terminology in per unit.

Since $R_{10}$ and $L_{10}$ are representative of field parameters, if field voltage is changed by $\Delta V_{fd}$, this can be represented on the analog by a suitable voltage source injected at point A in FIG. 5. The required injection voltage can be shown to be:

$$(B\ (T_d^1 - T_d'')/V_o \sin \delta_o (T_{do}^1 - T_d^1)(T_d^1 - T_{do}''))((1+sT_{kd})/s(1+sT_d'')) \cdot \Delta V_{fd}$$

(17)

This can conveniently be arranged in practice using a normal electronic amplifier, which can incorporate the time functions of (17).

The input of this amplifier is then an equivalent injection point for field voltage changes and can be used to inject a small disturbance (as often done for test purposes on a real system) and also for adding field control signals derived from the equivalents of machine power or angle changes as above.

The values of $L_{10} - L_{13}$ above are clearly functions of the machine reactances and initial working conditions. The values of $R_{11} - R_{13}$ further depend on field and damper resistances. The damping effects of the latter can be shown to be removed if required by making $R_{12}$ and $R_{13}$ tend to infinity and $R_{11}$ tend to zero, when the resistance/inductance network in FIG. 5 reduces to a single equivalent inductor equal to $L_{10}$ and $L_{11}$ in parallel, which can be shown to be the same as the single inductor L of FIG. 2.

Where the machine is connected to a finite a.c. system these analog component values are an approximation, but are sufficiently accurate for normal engineering purposes.

The capacitor C is the same as before from equation 7, and the voltage across it represents change of absolute shaft angle from equation 6 as before. Voltages elsewhere in the analogue represent change of absolute electrical phase of the voltage at the corresponding point in the real system. Change of machine shaft speed may be derived using the relationship $$\Delta f = 1/2\pi \cdot d\Delta\theta/dt = 1/2\pi B \cdot dv/dt$$

(18)

Since the voltage $v$ is directly accessible, it follows from equation 18 that a signal proportional to the frequency change $\Delta f$ may be obtained from the output of a normal differentiating amplifier DE having its input derived from the voltage $v$.

The real system disturbances, e.g. opening and closing circuit-breakers, and short circuits may readily be simulated in the analog.

In particular, the opening of a circuit-breaker to disconnect a line in the system e.g. $S_1$ in FIG. 3 has an effect on phase angles equivalent to:
a. changing the line reactance to infinity, and
b. inserting a new power flow, equal but opposite to that originally flowing in the line, into each of the two busbars to which the line was connected.

On the analog these effects may be obtained as shown in FIG. 4 by
a. open-circuiting the point corresponding to the position of the circuit-breaker by a switch $S_2$, and
b. suddenly injecting ramp-functions of current equal in magnitude but opposite in sign into the points on the analog corresponding to the two busbars by sources 25,26, the rate-of-change of current ($di/dt$) being calculated from equation 5, where $\Delta P$ is the line power previously existing. Conventional electronic waveform generators and current amplifiers may conveniently be employed as such sources.

The re-closing of the circuit-breaker (if required) is simulated by the converse steps, that is by stopping the current ramps at the current they may have attained at the particular time, and by re-connecting together the points corresponding to the position of the circuit-breaker by switch $S_2$. The switching action $S_2$ on the analog may be readily obtained by any well-known form of electronic switch, e.g. a transistor, controlled by a suitable electronic pulse generator.

After applying the appropriate functions of current corresponding to a desired circuit-breaker opening (followed by re-closing if desired) and completing the time desired for observation of the effects on the system, it is not important in principle what happens to the currents injected into the analog system; however, it is convenient in practice to restore the currents to zero immediately after this time particularly if repetitive operation of the analog is required.

With regard to the simulation of a short circuit, this produces zero voltage at the fault point on the real system, e.g. on a line, the power transfer falling to zero; for present purposes this produces effects identical to that of simply opening circuit-breakers in the line, and may be simulated as above.

A simulation of a load change $\Delta P$ at a particular point e.g. by opening or closing circuit breaker $S_3$ in FIG. 3 may be carried out by arranging a current source such as a suitable electronic amplifier 24 in FIG. 4, to inject a current $i$ at the corresponding point on the analog, where $i$ is related to $\Delta P$ from equation 5 by $$i = AB \int \Delta P \, dt = AB/s \, \Delta P \ldots$$

(19)

where $s$ is the operator $d/dt$

For example, a suddenly applied load of $\Delta P$ from equation 19 will require a ramp function of current of rate $AB\Delta P$ suddenly applied to the analog.

The appropriate measurement on the analog may be made by an oscilloscope from which the waveforms at various points may be observed. The representations will give phase angle changes and rotor angle changes directly in terms of oscilloscope voltage, from equation 6. Power changes may be obtained from current derivative using equation 5, but are more conveniently observed as the proportional voltage across an inductor through which the relevant current flows.

If any d.c. transmission links are connected in the a.c. systems they are not represented in the analog if they are operated at constant power.

Figure 6:
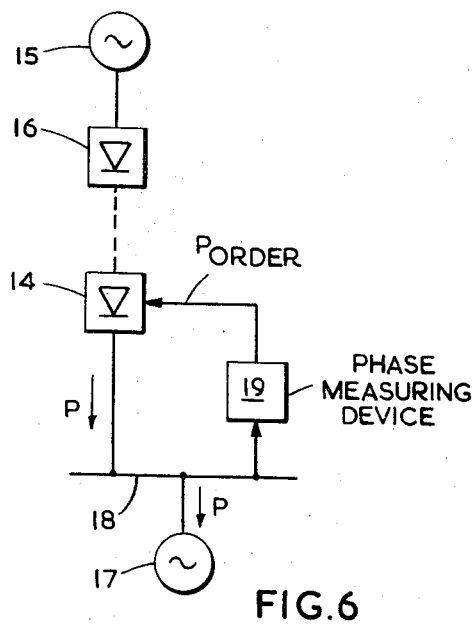
FIG. 6 is a diagram of a d.c. link interconnecting two a.c. systems for which an analog circuit may be derived.

However, if the d.c. power is controlled in response to signals derived from one of the a.c. systems, e.g. as shown in FIG. 6, then the effect of the d.c. link may be introduced into the analog.

In particular, FIG. 6 shows a system in which an invertor 14 draws power from an a.c. system 15 via a rectifier 16, and supplies power P into a receiving system 17 via a busbar 18. The d.c. link is controlled to provide the power P substantially equal to an order signal (P order) derived from measuring apparatus 19 which derives a signal proportional to a change function of absolute phase angle of the voltage on busbar 18, e.g. apparatus as described in my copending U.S. Pat. application Ser. No. 36156 filed May 11 1970 now U.S. Pat. No. 3,668,413.

Accordingly, $$P = P_{order} = P_{setting} + f(s)\,\theta$$

where $P_{setting}$ is a fixed signal $f(s)$ is a time function $\theta$ is absolute phase angle of the busbar voltage and $s$ is the diffential operator $d/dt$ as before.

The function $f(s)$ is assumed to be a linear operational function at least for small changes, and therefore will in general consist of the ratio of two polynomials in $s$, containing only powers of $s$, and constants.

It can be shown that the effect of the d.c. link on the a.c. receiving system 17 is equivalent in the analog to a shunt impedance $$Z = 1/A \cdot s/f(s)$$

As an example, if $f(s) = Ks$ where $K$ is a constant, then $Z = 1/AK$ which corresponds to a pure resistor.

Alternatively, if $$f(s) = KsT/1 + sT \text{ where } K \text{ and } T \text{ are constants,}$$

then $$Z = 1/AKT + s/AK$$

which is a pure resistor $1/AKT$ in series with an inductor $1/AK$.

Figure 7:
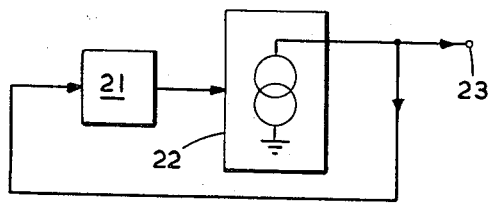
FIG. 7 shows the equivalent analog circuit of FIG. 6.

Analogs of more complex functions may be obtained although in some cases these cannot be realised by passive components alone. For example, an analog circuit of the scheme shown in FIG. 6 is shown in FIG. 7 in which an operational amplifier is employed.

In this latter Figure an operational voltage amplifier 21 delivers a voltage input to an amplifier 22 which in turn delivers a current output to a terminal 23 connected to the appropriate point in the overall analog circuit of the whole scheme, this output being additionally fed back as the input to amplifier 21.

The operational amplifier 21 has a transfer function given by $$K_1 f(s)/s$$

where $K_1$ is a constant.

This method may readily be extended to the case where control signals are derived from each end of the d.c. link, instead of the one end shown, and where the a.c. systems at both ends are to be studied.

In practice, it may be convenient to operate the analog faster than real time, that is to say, faster than the simulated change in the power system represented, as is often done in normal analog computing practice. As an example, for a time scale speed-up factor of 1,000, the following changes are required:

a. After calculating analog components in real time as above, all inductance and capacitance values are decreased by 1,000 times, resistors being left unchanged. This also applies to components directly associated with operational amplifier 21.

b. The rate of change of current in any applied ramp function of current is increased by 1,000 times.

c. The relative timing of analog disturbances (e.g. time between tripping and re-closing of a circuit breaker) is reduced by 1,000 times.

d. The time scale of voltages and currents observed on the analog is increased by a factor of 1,000 to obtain equivalent real time scale.

Repetitive operation of the analog may be obtained by restoring all inputs to their initial values after the desired observation time, waiting a further time for transients to die away, then repeating the input disturbances, and so on. It is a substantial advantage in this case to operate faster than real time as above, since with a sufficiently high repetition frequency the traces observed on a cathode-ray oscilloscope appear to be stationary, and the results of experimental changes made to parameters by changing analog component values can be observed almost instantly.

Figure 8:
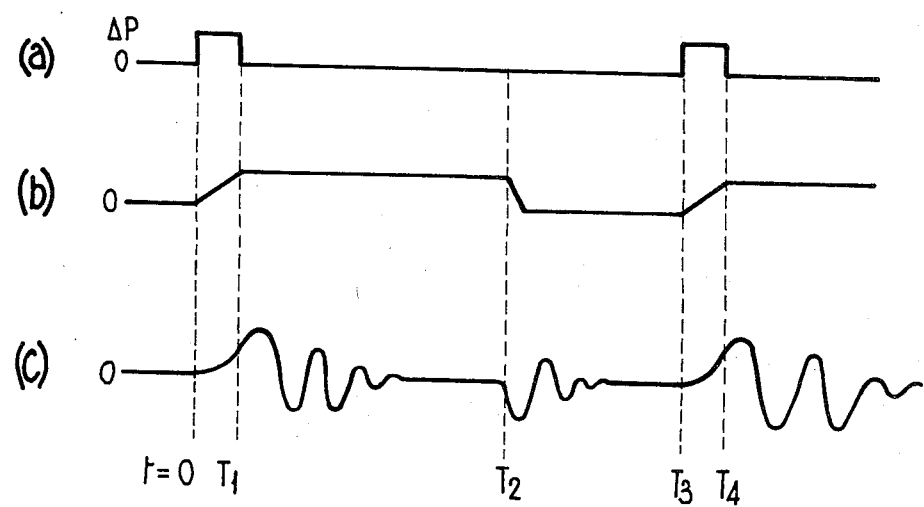
FIG. 8 shows the operating waveforms on the analog for a particular disturbance.

As an example, FIG. 8 shows waveforms relevant to repetitive operation of the analog for the case of an additional load switched on for a finite time $T_1$ and then removed, as shown at $(a)$. This corresponds to an injected current waveform applied to the analogue circuit as shown in $(b)$, consisting of a ramp stopping at time $T_1$. Assuming observations are only required up to a time $T_2$, then at any subsequent time $T_3$ the injected current may be restored to zero in preparation for the next transient to be applied at time $T_4$. Waveform $(c)$ is of the voltage at some typical point in the analog, representing phase angle change caused by the transient for example, across the capacitor $C_1$ of FIG. 4. At time $T_3$ the resetting of injected current causes an unavoidable further transient in the analog. This is outside the time of interest and need not be inspected by oscilloscope, but time $T_4$ (i.e., repetition period of operation) should be sufficiently great that all transients have died away by time $t = T_4$. For a typical a.c. system, if $T_1$ is say 1 second, then observation time $T_2$ might be say 10 seconds, $T_3$ can be say 12 seconds, and $T_4$ say 20 seconds. The above description was for an analog operation in real time, but if a time scale speed-up of 1,000 times is used on the analog these correspond to analog times of $t_2 = 10$ms, $t_3 = 12$ms and $t_4 = 20$ ms, where the letter $t$ indicates a time on the analog corresponding to a real system time $T$, with appropriate subscripts in each case. Repetition period on the analog is then $t_4 = 20$ ms, and repetition frequency 50 per second.

Thus the steps required in practice in order to put the invention into effect may be summarised as follows:

a. Determine the single-line equivalent series reactance diagram of the power system, on a per unit basis.

b. Determine the required initial steady state load flow, including power and phase angle at all points.

c. Set up an analog network of inductors in the same topological arrangement as the single-line reactance diagram, with values calculated according to equation 9.

d. Set up an analog network corresponding to each machine node similar to FIG. 5 with values calculated from equations 7 and 10 to 16 to represent each synchronous machine. The simpler arrangement of FIG. 2 consisting on one inductor and one capacitor may be used if damping effects are not required, or for machines remote from a disturbance.

e. Excite the analog from a suitable electronic waveform generator and electronic amplifiers to represent a desired disturbance as described above. Repetitive operation may be used, as for example as shown in FIG. 8.

f. Observe voltage and current waveforms at required points in the analog by cathode-ray oscilloscope, interpreting voltage as phase angle or machine rotor angle change, rate of change of voltage as frequency or speed change, and rate of change of current as power change. The constants of proportionality in these observations are set forth in equation 6 for phase angle or rotor angle, in equation 18 for frequency or speed change, and in equation 5 for power change.

I claim:

1. Apparatus for simulating transient changes with respect to time in power flows, phase angles, machine speeds and frequencies in an a.c. power system embodying synchronous machines, including an analog network of electrical components, and at least one source of electrical current connectable to the network, wherein the network components are selected and connected such that the differential equations relating the currents and voltages in said network are substantially similar to the linearized differential equations relating small changes of powers, phase angles, machine speeds, and frequencies in said a.c. power system, said electrical current source being connected to provide analog functions of defined disturbances applied to said a.c. power system, and the apparatus including indicating means connected to the network so as to be responsive to electrical quantities in the network and to provide output signals which are analog functions of changes in powers, phase angles, machine speeds, and differentiator means to generate a signal responsive to frequencies in said a.c. power system.

2. Apparatus as claimed in claim 1 in which said analogue network includes a first group of components representing the equivalent series reactances of lines and transformers in said a.c. power system, and a second group of components representing each synchronous machine in said system.

3. Apparatus as claimed in claim 2 in which said first group of components comprises inductors proportional to the per unit value of each reactance in the power system and connected in a similar topological configuration.

4. Apparatus as claimed in claim 2 in which a said second group of components comprises capacitor proportional to the inertia of the machines, inductor means of values which are functions of the per unit reactances of the machines, and resistor means which are functions of machine damper winding and field winding resistances.

5. Apparatus as claimed in claim 1 wherein said current source provides an analog of a defined load power change and which is connected to the analog network at a nodal point corresponding to that of the real system.

6. Apparatus as claimed in claim 1 which further includes switch means for simulating a disturbance consisting of the opening of a line in the power system connected between the corresponding two nodes on the analog network, and wherein current sources connected to each said node on the analog network, each capable of producing a current of a value which is a function of the power previously existing in the line.

7. Apparatus according to claim 1 in which said indicating means is a cathode-ray oscilloscope.

8. Apparatus according to claim 1 in which said network includes components forming an analog of a high voltage direct current power transmission link in said a.c. power system, said components including means providing a representation of the effect of the control of the power of said hv-dc link from a function of frequency, phase angle, or power in said a.c. power system.

9. Apparatus according to claim 8 in which said components forming an analog of an hv-dc link are passive components.

10. Apparatus according to claim 8 in which said components forming an analog of an *hv-dc* link include one or more electronic amplifiers.

* * * * *